(12) United States Patent
Niu (10) Patent No.: US 12,405,138 B2
(45) Date of Patent: Sep. 2, 2025

(54) METHOD AND APPARATUS FOR CALIBRATING JOYSTICK AND REMOTE CONTROL DEVICE

(71) Applicant: AUTEL ROBOTICS CO., LTD., Guangdong (CN)

(72) Inventor: Hongfang Niu, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 410 days.

(21) Appl. No.: 17/660,551

(22) Filed: Apr. 25, 2022

(65) Prior Publication Data
US 2022/0244081 A1 Aug. 4, 2022

Related U.S. Application Data

(63) Continuation of application No. PCT/CN2020/118851, filed on Sep. 29, 2020.

(30) Foreign Application Priority Data

Oct. 22, 2019 (CN) .......................... 201911007584.4

(51) Int. Cl.
*G01D 18/00* (2006.01)
*G01D 5/14* (2006.01)
*G05G 9/047* (2006.01)

(52) U.S. Cl.
CPC ............. *G01D 18/00* (2013.01); *G01D 5/145* (2013.01); *G05G 9/047* (2013.01)

(58) Field of Classification Search
CPC ...... G01D 5/145; G01D 18/00; G01D 18/008; G01D 5/14; G05G 9/047; G05G 5/145
See application file for complete search history.

(56) References Cited

U.S. PATENT DOCUMENTS 9,904,459 B2  2/2018  Lin et al.

FOREIGN PATENT DOCUMENTS

CN  107463277 A  12/2017
CN  108008759 A  5/2018
(Continued)

OTHER PUBLICATIONS

H. Zangl, T. Bretterklieber, G. Steiner and K. Riedmuller, "Feasibility Study for a Three-Axial Joystick based on an Array of Lateral Hall Elements," Sensors, 2007 IEEE, Atlanta, GA, USA, 2007, pp. 1069-1072, doi: 10.1109/ICSENS.2007.4388590. (Year: 2007).*

(Continued)

*Primary Examiner* — Jennifer Bahls (57) ABSTRACT

The embodiments are a method and an apparatus for calibrating a joystick and a remote control device. The method includes: obtaining sampling parameters of a target point when a joystick is in a calibration mode; obtaining a maximum angle value to which the joystick is moved; calculating a calibration parameter of the target point according to the sampling parameters and the maximum angle value; and calibrating the joystick according to the calibration parameter. According to the implementation, a calibration function of the Hall joystick is realized. A whole process is simple, complexity of calibrating the Hall joystick is reduced and the implementation is suitable for most of remote control devices with Hall joysticks, which has relatively strong universality.

27 Claims, 7 Drawing Sheets

(56) References Cited

FOREIGN PATENT DOCUMENTS

| CN | 108176044 | A |   | 6/2018  |          |
|----|-----------|---|---|---------|----------|
| CN | 110244619 | A |   | 9/2019  |          |
| CN | 110597350 | A |   | 12/2019 |          |
| EP | 3539820   | A1 | * | 9/2019 | ............ B66F 11/046 |
| WO | WO-2009004502 | A1 | * | 1/2009 | ............ B82Y 25/00 |

OTHER PUBLICATIONS

The International Search Report mailed Dec. 30, 2020; PCT/CN2020/118851 with English Translation.

* cited by examiner

METHOD AND APPARATUS FOR CALIBRATING JOYSTICK AND REMOTE CONTROL DEVICE

CROSS-REFERENCE TO RELATED APPLICATIONS

The present application is a continuation of International Application No. PCT/CN2020/118851, filed on Sep. 29, 2020, which claims priority to Chinese patent application No. 201911007584.4, filed on Oct. 22, 2019, which is incorporated herein by reference in its entirety.

TECHNICAL FIELD

The present invention relates to the field of remote control technologies and in particular, to a method and an apparatus for calibrating a joystick and a remote control device.

BACKGROUND

Most of traditional remote control devices of unmanned aerial vehicles adopt potentiometer joysticks. The principle of the potentiometer joystick is simple to implement, the potentiometer joystick is cheap and the structure of the potentiometer joystick is easy to design. However, during a long-term usage process, there is constant friction between the potentiometer and the joystick. As a result, the control data of the remote control device will gradually become inaccurate, so that the safe control of the controlled apparatus cannot be guaranteed. There is no contact between the Hall chip of the Hall joystick and the joystick, which exactly avoids the shortcoming of the potentiometer joystick. The parameter calibration is required regardless of whether the potentiometer joystick or the Hall joystick is used. Moreover, compared with the potentiometer joystick, the traditional method for calibrating the Hall joystick is more complicated.

SUMMARY

The technical problem to be solved according to the present invention is to provide a method and an apparatus for calibrating a joystick and a remote control device, so as to solve the technical problem that joystick calibration is very complicated.

According to an aspect of embodiments of the present invention, a method for calibrating a joystick is provided and applicable to a remote control device, the method including:
obtaining sampling parameters of a target point when a joystick is in a calibration mode;
obtaining a maximum angle value to which the joystick is moved;
calculating a calibration parameter of the target point according to the sampling parameters and the maximum angle value; and
calibrating the joystick according to the calibration parameter.

Optionally, the obtaining sampling parameters of a target point includes:
controlling the joystick to move to the target point; and
calculating a horizontal angle value $\alpha$ and a vertical angle value $\beta$ corresponding to the target point, the horizontal angle value $\alpha$ and the vertical angle value $\beta$ being the sampling parameters of the target point, where the $\alpha = \arctan 2 \ (\sqrt{(k_a * m_z)^2 + (k_t * m_y)^2}, m_x)$ and the $\beta = \arctan 2 \ (\sqrt{(k_b * m_z)^2 + (k_t * m_x)^2}, m_y)$, $m_x$, $m_y$ and $m_z$ being magnetic fluxes outputted by a chip in three axes x, y and z and $k_a$, $k_b$ and $k_t$ being preset adjustable parameters.

Optionally, the method further includes:
respectively sampling the horizontal angle value $\alpha$ and the vertical angle value $\beta$ of the target point for a preset number of times; and
calculating an average value of horizontal angle values $\alpha$ of the preset number of times and an average value of vertical angle values $\beta$ of the preset number of times, the average value of the horizontal angle values $\alpha$ and the average value of the vertical angle values $\beta$ being the sampling parameters of the target point.

Optionally, the target point includes a median point, a diagonal point and a sideline point.

Optionally, when the target point is the diagonal point, the calculating a calibration parameter of the target point according to the sampling parameters and the maximum angle value includes:
performing a subtraction operation between a horizontal angle value of the diagonal point and a horizontal angle value of the median point, to obtain a first difference;
performing a subtraction operation between a vertical angle value of the diagonal point and a vertical angle value of the median point, to obtain a second difference; and
performing a division operation on the maximum angle value and each of the first difference and the second difference, to obtain a first quotient and a second quotient, the first quotient being a calibration parameter of the diagonal point in a horizontal direction and the second quotient being a calibration parameter of the diagonal point in a vertical direction.

Optionally, the sideline point includes a horizontal axis sideline point and a vertical axis sideline point,
when the target point is the horizontal axis sideline point, the calculating a calibration parameter of the target point according to the sampling parameters and the maximum angle value includes:
performing a subtraction operation between a horizontal angle value of the horizontal axis sideline point and a horizontal angle value of the median point, to obtain a third difference;
performing a division operation between the maximum angle value and the third difference, to generate a calibration parameter of the horizontal axis sideline point in a horizontal direction; and
when the target point is the vertical axis sideline point, the calculating a calibration parameter of the target point according to the sampling parameters and the maximum angle value includes:
performing a subtraction operation between a vertical angle value of the vertical axis sideline point and a vertical angle value of the median point, to obtain a fourth difference; and
performing a division operation between the maximum angle value and the fourth difference, to generate a calibration parameter of the vertical axis sideline point in a vertical direction.

Optionally, a calibration parameter of the median point in the horizontal direction and a calibration parameter in the vertical direction are 1; a calibration parameter of the horizontal axis sideline point in the vertical direction is 1;

and a calibration parameter of the vertical axis sideline point in the horizontal direction is 1.

Optionally, the method further includes:
performing division around the target point to obtain sectors according to a position of the target point;
calculating calibration parameters of the sectors according to the sectors obtained through the division and the calibration parameter of the target point; and
calibrating the joystick according to the calibration parameters of the sectors.

Optionally, the calculating calibration parameters of the sectors according to the sectors obtained through the division and the calibration parameter of the target point includes:
determining target points corresponding to the sectors; and
averaging calibration parameters of the target points corresponding to the sectors, to generate the calibration parameters of the sectors.

According to another aspect of the embodiments of the present invention, an apparatus for calibrating a joystick is provided and applicable to a remote control device, the apparatus including:
a first obtaining module, configured to obtain sampling parameters of a target point when a joystick is in a calibration mode;
a second obtaining module, configured to obtain a maximum angle value to which the joystick is moved;
a first calculation module, configured to calculate a calibration parameter of the target point according to the sampling parameters and the maximum angle value; and
a first calibration module, configured to calibrate the joystick according to the calibration parameter.

Optionally, the first obtaining module is further configured to:
control the joystick to move to the target point when the joystick is in the calibration mode; and
calculate a horizontal angle value $\alpha$ and a vertical angle value $\beta$ corresponding to the target point, the horizontal angle value $\alpha$ and the vertical angle value $\beta$ being the sampling parameters of the target point,
where the $\alpha=\arctan 2\ (\sqrt{(k_a*m_z)^2+(k_t*m_y)^2},\ m_x)$ and the $\beta=\arctan 2\ (\sqrt{(k_b*m_z)^2+(k_t*m_x)^2},\ m_y)$,
$m_x$, $m_y$ and $m_z$ being magnetic fluxes outputted by a chip in three axes x, y and z and $k_a$, $k_b$ and $k_t$ being preset adjustable parameters.

Optionally, the first obtaining module is further configured to:
respectively sample the horizontal angle value $\alpha$ and the vertical angle value $\beta$ of the target point for a preset number of times; and
calculate an average value of horizontal angle values $\alpha$ of the preset number of times and an average value of vertical angle values $\beta$ of the preset number of times, the average value of the horizontal angle values $\alpha$ and the average value of the vertical angle values $\beta$ being the sampling parameters of the target point.

Optionally, the target point includes a median point, a diagonal point and a sideline point.

Optionally, when the target point is the diagonal point, the first calculation module is further configured to:
perform a subtraction operation between a horizontal angle value of the diagonal point and a horizontal angle value of the median point, to obtain a first difference;
perform a subtraction operation between a vertical angle value of the diagonal point and a vertical angle value of the median point, to obtain a second difference; and
perform a division operation on the maximum angle value and each of the first difference and the second difference, to obtain a first quotient and a second quotient, the first quotient being a calibration parameter of the diagonal point in a horizontal direction and the second quotient being a calibration parameter of the diagonal point in a vertical direction.

Optionally, the sideline point includes a horizontal axis sideline point and a vertical axis sideline point,
when the target point is a horizontal axis sideline point, the first calculation module is further configured to:
perform a subtraction operation between a horizontal angle value of the horizontal axis sideline point and a horizontal angle value of the median point, to obtain a third difference;
perform a division operation between the maximum angle value and the third difference, to generate a calibration parameter of the horizontal axis sideline point in a horizontal direction; and
when the target point is a vertical axis sideline point, the first calculation module is further configured to:
perform a subtraction operation between a vertical angle value of the vertical axis sideline point and a vertical angle value of the median point, to obtain a fourth difference; and
perform a division operation between the maximum angle value and the fourth difference, to generate a calibration parameter of the vertical axis sideline point in a vertical direction.

Optionally, a calibration parameter of the median point in the horizontal direction and a calibration parameter in the vertical direction are 1;
a calibration parameter of the horizontal axis sideline point in the vertical direction is 1; and a calibration parameter of the vertical axis sideline point in the horizontal direction is 1.

Optionally, the apparatus further includes:
a processing module, configured to perform division around the target point to obtain sectors according to a position of the target point;
a second calculation module, configured to calculate calibration parameters of the sectors according to the sectors obtained through the division and the calibration parameter of the target point; and
a second calibration module, configured to calibrate the joystick according to the calibration parameters of the sectors.

Optionally, the second calculation module is further configured to:
determine target points corresponding to the sectors; and
average calibration parameters of the target points corresponding to the sectors, to generate the calibration parameters of the sectors.

According to still another aspect of the embodiments of the present invention, a remote control device is provided and includes: a remote control body;
a Hall joystick, fixed on the remote control body; at least one processor; and a memory communicatively connected to the at least one processor, the memory storing instructions executable by the at least one processor, the instructions being executed by the at least one processor, to enable the at least one processor to perform the method described above.

According to the embodiments of the present invention, when the joystick is in the calibration mode, the sampling parameters of the target point and the maximum angle value to which the joystick is moved are obtained. Then the calibration parameter of the target point is calculated according to the sampling parameters and the maximum angle value, so that the joystick is calibrated according to the calibration parameter. According to the implementation, a calibration function of the Hall joystick is realized. A whole process is simple, complexity of calibrating the Hall joystick is reduced and the implementation is suitable for most of remote control devices with Hall joysticks, which has relatively strong universality.

BRIEF DESCRIPTION OF THE DRAWINGS

One or more embodiments are exemplarily described with reference to the corresponding figures in the accompanying drawings and the descriptions are not to be construed as limiting the embodiments. Components in the accompanying drawings that have same reference numerals are represented as similar components and unless otherwise particularly stated, the figures in the accompanying drawings are not drawn to scale.

DETAILED DESCRIPTION

To make the objectives, technical solutions and advantages of the present invention clearer and more comprehensible, the following further describes the present invention in detail with reference to the accompanying drawings and embodiments. It should be understood that the embodiments herein are provided for describing the present invention and not intended to limit the present invention.

It should be noted that, if no conflict occurs, features in the embodiments of the present invention may be combined with each other and fall within the protection scope of the present invention. In addition, although functional module division is performed in the schematic diagram of the apparatus and a logical sequence is shown in the flowchart, in some cases, the shown or described steps may be performed by using module division different from the module division in the structural diagram of the apparatus, or in a sequence different from the sequence in the flowchart.

A remote control device in the embodiments of the present invention includes a remote control body and a Hall joystick. The Hall joystick is fixed on the remote control body for a user to operate to input a remote control instruction to the remote control device. The number of Hall joysticks may be set as required, for example, set to one, two or more. In this embodiment, the remote control device includes two Hall joysticks. The two Hall joysticks are respectively a left Hall joystick and a right Hall joystick, which is convenient for the user to separately or simultaneously operate by the left and right hands.

Figure 1:
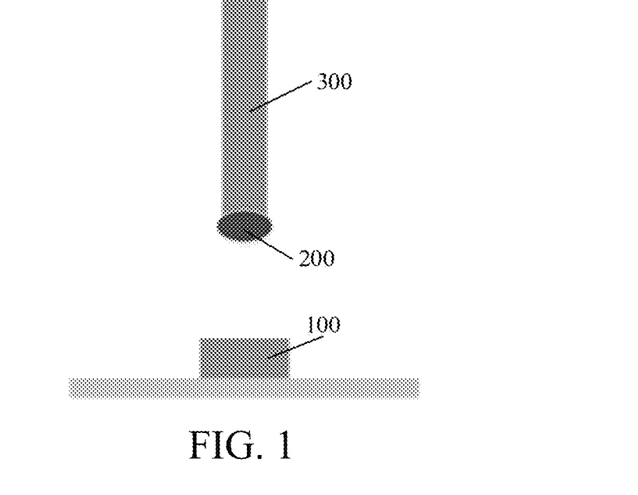
FIG. 1 is a schematic structural diagram of a Hall joystick according to an embodiment of the present invention.
Figure 2:
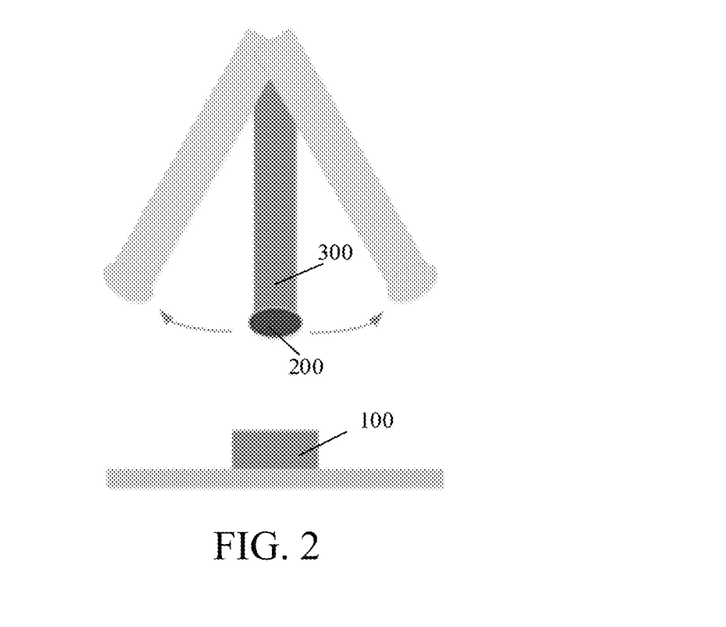
FIG. 2 is a schematic diagram of a movement state of a Hall joystick according to an embodiment of the present invention.

As shown in FIG. 1, each Hall joystick includes: a Hall chip 100, a magnet 200 and a joystick 300. The Hall chip 100 is fixed on the remote control device and the magnet 200 is fixed on the joystick 300. As shown in FIG. 2, when the joystick 300 is moved, the magnet will be driven to change according to a limited angle, a range of the angle being defined according to a structure of the joystick.

Figure 3:
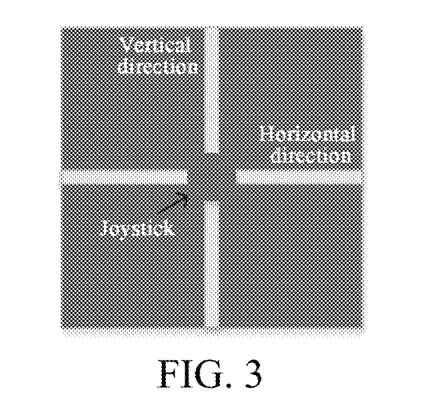
FIG. 3 is a schematic diagram of an operating range of a Hall joystick according to an embodiment of the present invention.

In this embodiment, as shown in FIG. 3, when the Hall joystick is stationary, the Hall joystick is in a middle position and maintains a median. When the Hall joystick is moved to the full in left and right regions, the Hall joystick can respectively reach a maximum angle value and a minimum angle value in a horizontal direction. When the Hall joystick is moved to the full in upper and lower regions, the Hall joystick can respectively reach a maximum angle value and a minimum angle value in a vertical direction. Whether moving leftward to the full or moving rightward to the full corresponds to the maximum angle value or the minimum angle value and whether moving upward to the full or moving downward to the full corresponds to the maximum angle value or the minimum angle value are not limited herein. For example, it is set that moving rightward to the full corresponds to the maximum angle value in the horizontal direction and moving leftward to the full corresponds to the minimum angle value in the horizontal direction. It is set that moving upward to the full corresponds to the maximum angle value in the vertical direction and moving downward to the full corresponds to the minimum angle value in the vertical direction.

Figure 4:
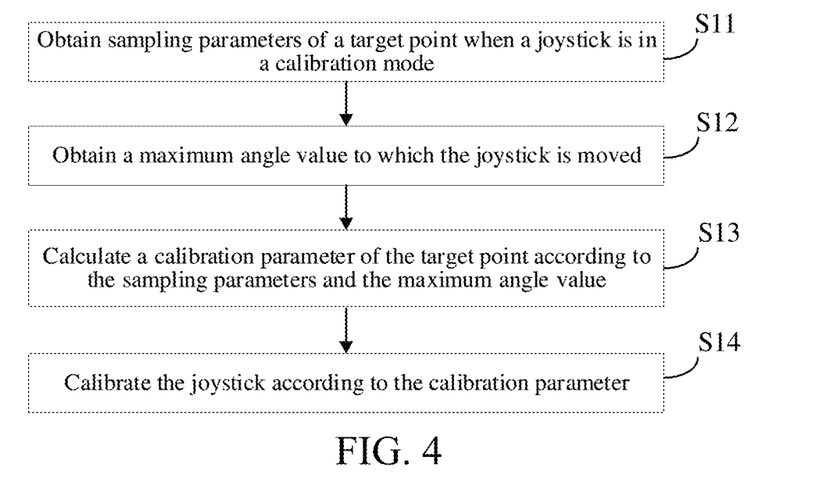
FIG. 4 is a flowchart of a method for calibrating a joystick according to an embodiment of the present invention.

In this embodiment, the remote control device can be configured to control devices such as an unmanned aerial vehicle, an unmanned ground vehicle or the like. The following describes a method for calibrating a joystick based on a Hall joystick of the remote control device. As shown in FIG. 4, the method includes the following steps:

Step S11. Obtain sampling parameters of a target point when a joystick is in a calibration mode.

The calibration mode refers to an operation mode for determining an indication error of the Hall joystick. A manner of triggering the calibration mode may be that the user actively enables the calibration mode. For example, the user inputs a calibration mode instruction by voice, or inputs the calibration mode instruction on a touchscreen of the remote control device through a finger, a stylus, or the like, or presses a button on the remote control device to input the calibration mode instruction, or the like, to enable the calibration mode. The manner of triggering the calibration mode may alternatively be automatically entering the calibration mode according to a preset condition. For example, when the remote control device is used for a first time, because the calibration parameter is not stored in a memory of the remote control device, the remote control device is in the calibration mode in this case. Alternatively, when powered on, the remote control device can detect whether the calibration parameter stored in the memory is available. If unavailable, the remote control device will automatically enter the calibration mode. Alternatively, when powered on, the remote control device determines whether the Hall joystick is in a preset position (such as a middle position). When detecting that the Hall joystick is not in the preset position within n seconds, the remote control device automatically enters the calibration mode, where n can be any value.

Target points refer to points used for determining the calibration parameter of the Hall joystick and these points are specifically points at specific positions determined according to a structure of the Hall joystick.

Figure 5:
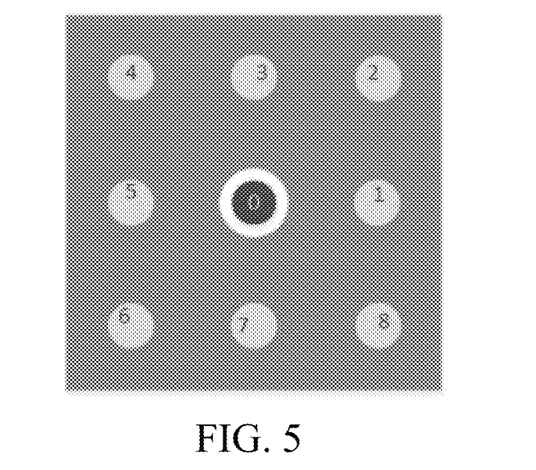
FIG. 5 is a schematic diagram of a target point of a Hall joystick according to an embodiment of the present invention.

For example, according to an operating range of the Hall joystick shown in FIG. 3, it can be determined that the target points include 9 singular points shown in FIG. 5, where point 0 is a median point, points 2, 4, 6 and 8 are diagonal points and points 1, 3, 5 and 7 are sideline points. The median point is a point corresponding to a central position of the Hall joystick. In this embodiment, these 9 singular points need to be sampled.

Figure 6:
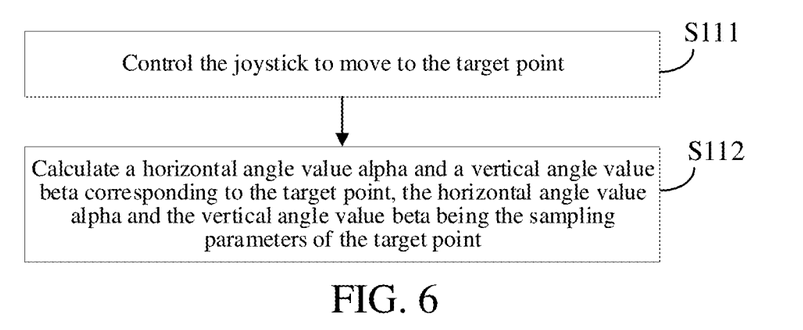
FIG. 6 is a flowchart of a method for obtaining sampling parameters of a target point according to an embodiment of the present invention.

Obtaining the sampling parameters of the target point is to perform parameter sampling on the target point. Specifically, as shown in FIG. 6, the obtaining sampling parameters of a target point includes:

Step S111. Control the joystick to move to the target point.

Specifically, the joystick can be controlled to move to the target point by the user and the remote control device detects whether the joystick is at the target point.

Step S112. Calculate a horizontal angle value α and a vertical angle value β corresponding to the target point, the horizontal angle value α and the vertical angle value β being the sampling parameters of the target point, where the $\alpha = \arctan 2\ (\sqrt{(k_a * m_z)^2 + (k_t * m_y)^2},\ m_x)$ and the $\beta = \arctan 2\ (\sqrt{(k_b * m_z)^2 + (k_t * m_x)^2},\ m_y)$, $m_x$, $m_y$ and $m_z$ being magnetic fluxes outputted by a chip in three axes x, y and z and $k_a$, $k_b$ and $k_t$ being preset adjustable parameters.

In this embodiment, each target point includes sampling parameters in the horizontal and vertical directions. Obtaining the sampling parameters in these two directions is to obtain the angle values of the Hall joystick moved in these two directions, that is, the horizontal angle value and the vertical angle value. The horizontal angle value α and the vertical angle value β may be calculated according to the foregoing formula. A principle of calculating the α and the 13 according to the formula may refer to the prior art.

The horizontal angle value α and the vertical angle value β corresponding to the target point include: a horizontal angle value α (0) and a vertical angle value β (0) corresponding to a median point 0, a horizontal angle value α (2/4/6/8) and a vertical angle value β (2/4/6/8) corresponding to a diagonal point 2/4/6/8, a horizontal angle value α (1/3/5/7) and a vertical angle value β (1/3/5/7) corresponding to a sideline point 1/3/5/7.

Figure 7:
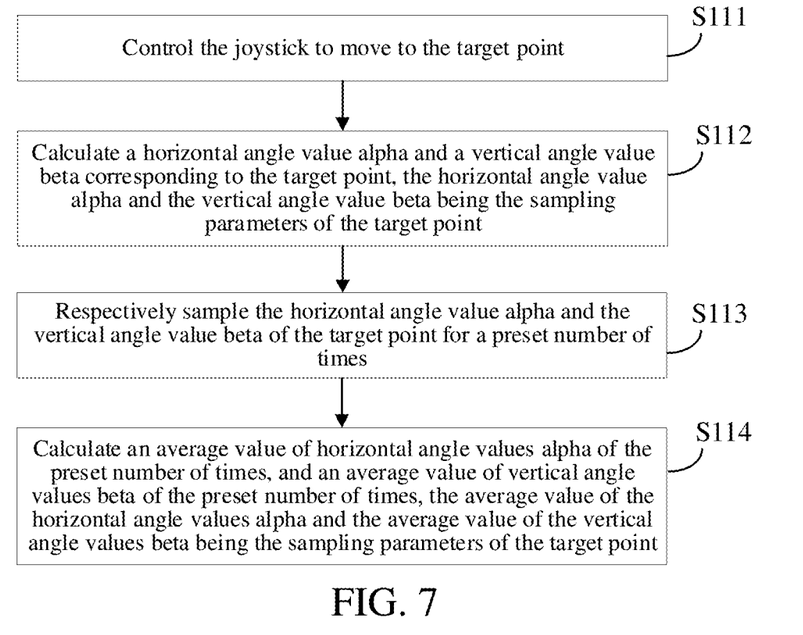
FIG. 7 is a flowchart of another method for obtaining sampling parameters of a target point according to an embodiment of the present invention.

In order to sample the target point more accurately, in some embodiments, as shown in FIG. 7, the method further includes:

Step S113. Respectively sample the horizontal angle value α and the vertical angle value β of the target point for a preset number of times. The preset number of times can be specifically defined by the user.

Step S114. Calculate an average value of horizontal angle values α of the preset number of times and an average value of vertical angle values β of the preset number of times, the average value of the horizontal angle values α and the average value of the vertical angle values β being the sampling parameters of the target point.

In this embodiment, the horizontal angle value α and vertical angle value β of the target point finally obtained are average values of the sampling values, thereby improving sampling accuracy of the target point and accuracy of calibration parameters obtained subsequently.

Step S12. Obtain a maximum angle value to which the joystick is moved.

The maximum angle value refers to the maximum angle to which the joystick is moved. The moving position is not limited, which may be any direction in four directions of up, down, left or right. Because the structure of the Hall joystick has been fixed, there is no need to distinguish directions in which the joystick is moved, because a maximum angle to which the joystick is moved in each direction is the same.

An operation of moving the joystick is specifically performed by the user. In this embodiment, operation prompt information for prompting the user to move the joystick may be issued to the user. For example, the remote control device broadcasts the operation prompt information in a voice broadcast manner, or the remote control device issues the operation prompt information on a display screen. After the user completes the operation of moving the joystick to the maximum angle, the remote control device obtains the maximum angle value.

In some embodiments, the maximum angle value to which the joystick is moved such as a latest detected maximum angle value may be pre-stored in the remote control device. Thus, the maximum angle value can be obtained directly from the memory. The pre-stored maximum angle value may be stored on the remote control device, or may be stored in a cloud server or the like.

Step S13. Calculate a calibration parameter of the target point according to the sampling parameters and the maximum angle value.

In this embodiment, the target point includes a median point, a diagonal point and a sideline point. According to position distribution of the target point in FIG. 5, a specific step of calculating the calibration parameter of the target point according to the sampling parameters and the maximum angle value is specifically described with reference to a horizontal left axis and a vertical left axis.

The calibration parameter of the median point in the horizontal direction and the calibration parameter in the vertical direction are both fixed to 1. Certainly, in practical application, the calibration parameter of the median point may alternatively be set to another value.

Figure 8:
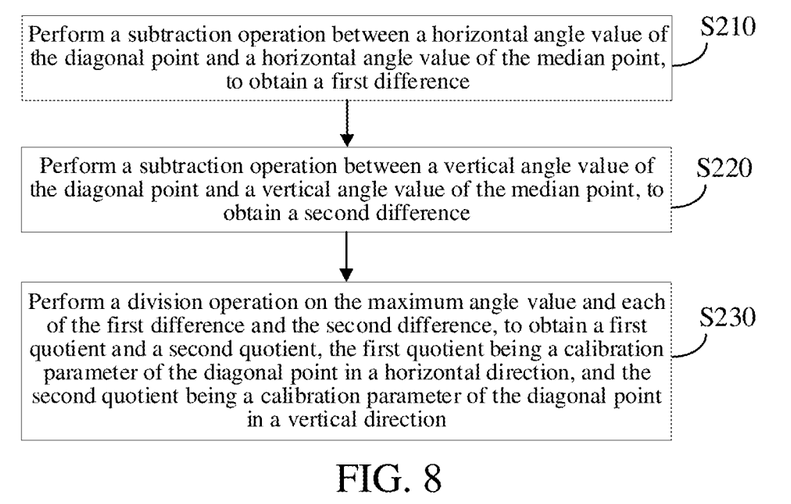
FIG. 8 is a flowchart of a method for calculating a calibration parameter of a target point according to a sampling parameter and a maximum angle value according to an embodiment of the present invention.

When the target point is a diagonal point, as shown in FIG. 8, the calculating a calibration parameter of the target point according to the sampling parameters and the maximum angle value includes:

Step S210. Perform a subtraction operation between a horizontal angle value of the diagonal point and a horizontal angle value of the median point, to obtain a first difference.

Step S220. Perform a subtraction operation between a vertical angle value of the diagonal point and a vertical angle value of the median point, to obtain a second difference.

Step S230. Perform a division operation on the maximum angle value and each of the first difference and the second difference, to obtain a first quotient and a second quotient, the first quotient being a calibration parameter of the diagonal point in a horizontal direction and the second quotient being a calibration parameter of the diagonal point in a vertical direction.

Four diagonal points 2, 4, 6 and 8 in FIG. 5 can adopt the foregoing steps to obtain their respective calibration parameters in the horizontal and vertical directions.

Figure 9:
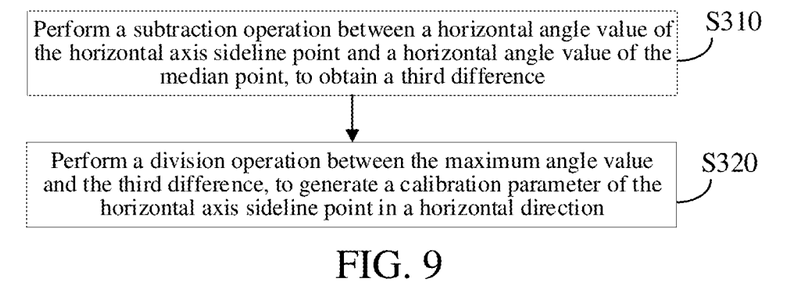
FIG. 9 is a flowchart of another method for calculating a calibration parameter of a target point according to a sampling parameter and a maximum angle value according to an embodiment of the present invention.

The sideline point includes a horizontal axis sideline point (such as point 1 and point 5) and a vertical axis sideline point (such as point 3 and point 7). When the target point is the horizontal axis sideline point, as shown in FIG. 9, the calculating a calibration parameter of the target point according to the sampling parameters and the maximum angle value includes:

Step S310. Perform a subtraction operation between a horizontal angle value of the horizontal axis sideline point and a horizontal angle value of the median point, to obtain a third difference.

Step S320. Perform a division operation between the maximum angle value and the third difference, to generate a calibration parameter of the horizontal axis sideline point in a horizontal direction.

A calibration parameter of the horizontal axis sideline point in the vertical direction is 1. In practical application, the calibration parameter of the horizontal axis sideline point in the vertical direction may alternatively be set to another value.

Figure 10:
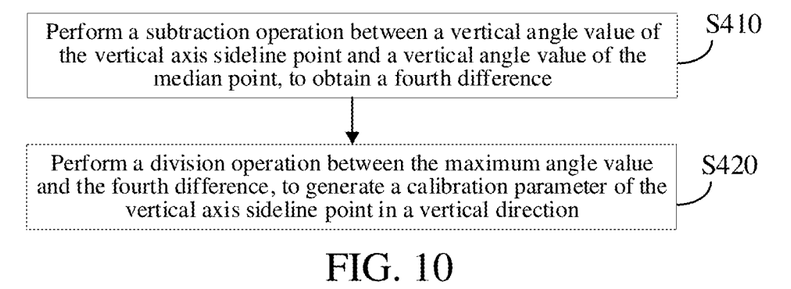
FIG. 10 is a flowchart of still another method for calculating a calibration parameter of a target point according to a sampling parameter and a maximum angle value according to an embodiment of the present invention.

When the target point is the vertical axis sideline point, as shown in FIG. 10, the calculating a calibration parameter of the target point according to the sampling parameters and the maximum angle value includes:

Step S410. Perform a subtraction operation between a vertical angle value of the vertical axis sideline point and a vertical angle value of the median point, to obtain a fourth difference.

Step S420. Perform a division operation between the maximum angle value and the fourth difference, to generate a calibration parameter of the vertical axis sideline point in a vertical direction.

A calibration parameter of the vertical axis sideline point in the horizontal direction is 1. In practical application, the calibration parameter of the vertical axis sideline point in the horizontal direction may alternatively be set to another value.

Step S14. Calibrate the joystick according to the calibration parameter.

The calibrating the joystick according to the calibration parameter includes: obtaining a new parameter of the joystick according to the calibration parameter and an original parameter of the joystick; and converting the new parameter of the joystick into a joystick instruction, that is, converting data obtained after the original data is processed by the calibration parameter into the joystick instruction used for controlling other devices by the remote control device, such as converting the data into a joystick instruction for controlling an unmanned aerial vehicle.

In some embodiments, in a process of calibrating the joystick, alarm information may also be issued to prompt the user that the joystick is currently in the calibration mode.

In some embodiments, in a process of calibrating the joystick, a whole calibration process can also be displayed on the remote control device and prompt information can be sent after the calibration is completed.

The following specifically describes the foregoing method for calibrating a joystick with an example. For example, referring to FIG. 5, calibrating the Hall joystick is to obtain calibration parameters of 9 singular points in FIG. 5. Sampling parameters of these 9 singular points are first obtained, which are respectively ($\alpha\_bias$ (0), $\beta\_bias$ (0)), ($\alpha\_bias$ (1), $\beta\_bias$ (1)), ($\alpha\_bias$ (2), $\beta\_bias$ (2)), ($\alpha\_bias$ (3), $\beta\_bias$ (3)), ($\alpha\_bias$ (4), 13_bias (4)), ($\alpha\_bias$ (5), $\beta\_bias$ (5)), ($\alpha\_bias$ (6), $\beta\_bias$ (6)), ($\alpha\_bias$ (7), $\beta\_bias$ (7)), ($\alpha\_bias$ (8), $\beta\_bias$ (8)). Then a maximum angle value is determined as scope_value.

Calibration parameters of diagonal points 2, 4, 6 and 8 are respectively calculated as:

$$\alpha\_scale[2]=scope\_value/(\alpha\_bias(2)-\alpha\_bias(0));$$
$$\beta\_scale[2]=scope\_value/(\beta\_bias(2)-\beta\_bias(0))$$

$$\alpha\_scale[4]=scope\_value/(\alpha\_bias(4)-\alpha\_bias(0));$$
$$\beta\_scale[4]=scope\_value/(\beta\_bias(4)-\beta\_bias(0))$$

$$\alpha\_scale[6]=scope\_value/(\alpha\_bias(6)-\alpha\_bias(0));$$
$$\beta\_scale[6]=scope\_value/(\beta\_bias(6)-\beta\_bias(0))$$

$$\alpha\_scale[8]=scope\_value/(\alpha\_bias(8)-\alpha\_bias(0));$$
$$\beta\_scale[8]=scope\_value/(\beta\_bias(8)-\beta\_bias(0))$$

Calibration parameters of sideline points 1, 3, 5 and 7 are respectively calculated as:

$$\alpha\_scale[1]=scope\_value/(\alpha\_bias(1)-\alpha\_bias(0));$$
$$\beta\_scale[1]=1$$

$$\alpha\_scale[3]=1; \beta\_scale[3]=scope\_value/(\alpha\_bias(3)-\alpha\_bias(0))$$

$$\alpha\_scale[5]=scope\_value/(\alpha\_bias(5)-\alpha\_bias(0));$$
$$\beta\_scale[5]=1$$

$$\alpha\_scale[7]=1; \beta\_scale[7]=scope\_value/(\alpha\_bias(7)-\alpha\_bias(0))$$

The calibration parameter of the median point 0 is: $\alpha\_scale[0]=1$; $\beta\_scale[0]=1$.

Figure 11:
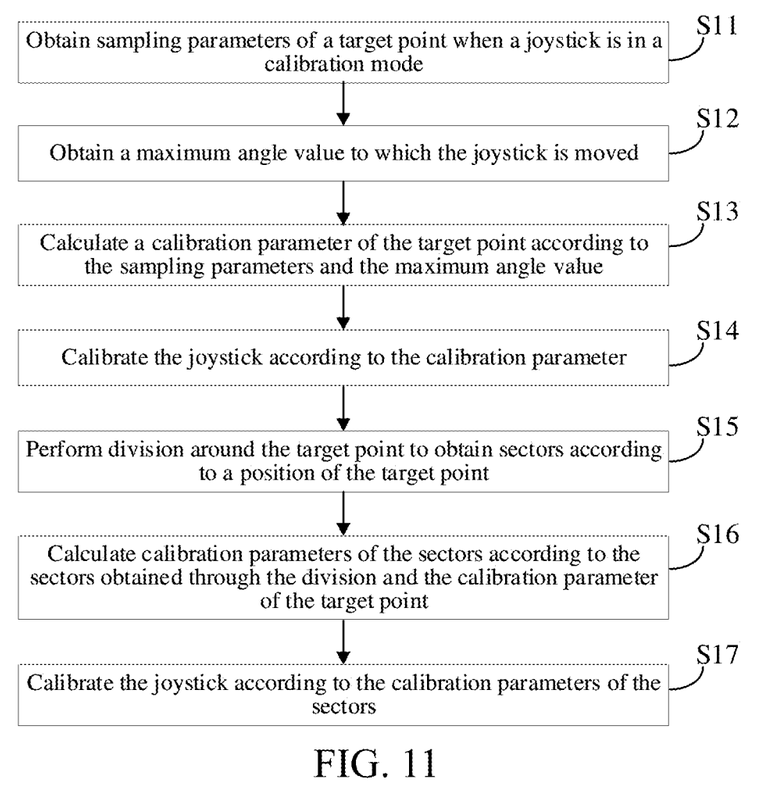
FIG. 11 is a flowchart of a method for calibrating a joystick according to another embodiment of the present invention.

In some embodiments, as shown in FIG. 11, a main difference between FIG. 11 and FIG. 4 is that the method further includes:

Step S15. Perform division around the target point to obtain sectors according to a position of the target point.

Figure 12:
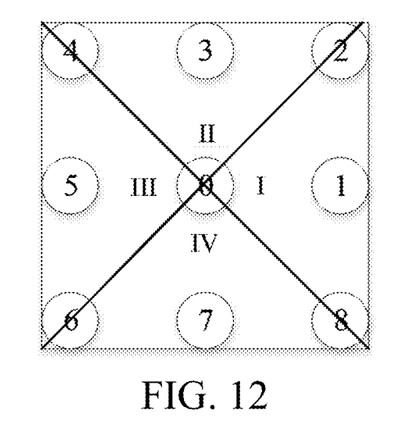
FIG. 12 is a schematic structural diagram of a type of sector division of a Hall joystick according to an embodiment of the present invention.

Specifically, performing division around the target point to obtain sectors according to the position of the target point is to divide a total region where the target point is located into several sub-regions. The sub-regions may have the same area and each sub-region includes the same number of target points. For example, as shown in FIG. 12, FIG. 13 and FIG. 14, the sector division can be performed in a manner of FIG.

Figure 13:
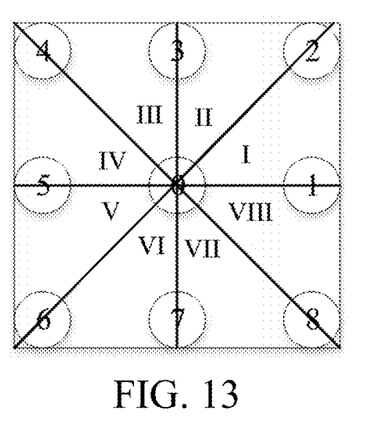
FIG. 13 is a schematic structural diagram of another type of sector division of a Hall joystick according to an embodiment of the present invention.
Figure 14:
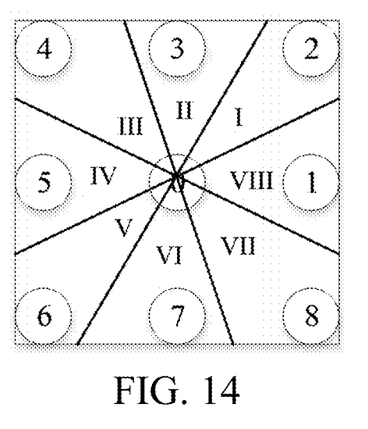
FIG. 14 is a schematic structural diagram of still another type of sector division of a Hall joystick according to an embodiment of the present invention.

12, FIG. 13 and FIG. 14. Certainly, the present invention is not limited to FIG. 12, FIG. 13 and FIG. 14.

Step S16. Calculate calibration parameters of the sectors according to the sectors obtained through the division and the calibration parameter of the target point.

The calculating calibration parameters of the sectors according to the sectors obtained through the division and the calibration parameter of the target point includes: determining target points corresponding to the sectors; and averaging calibration parameters of the target points corresponding to the sectors, to generate the calibration parameters of the sectors.

For example, as shown in FIG. 12, four sectors are obtained through division. In the horizontal direction, a calibration parameter of a first sector is sector_α_scale [1]=(α_scale [1]+α_scale [2]+α_scale [8])/3; a calibration parameter of a second sector is sector_α_scale [2]=(α_scale [2]+α_scale [3]+α_scale [4])/3; a calibration parameter of a third sector is sector_α_scale [3]=(α_scale [4]+α_scale [5]+α_scale [6])/3; and a calibration parameter of a fourth sector is sector_α_scale [4]=(α_scale [6]+α_scale [7]+α_scale [8])/3. In the vertical direction, the calibration parameter of the first sector is sector_α_scale [1]=(β_scale [1]+β_scale [2]+β_scale [8])/3; the calibration parameter of the second sector is sector_α_scale [2]=(β_scale [2]+β_scale [3]+β_scale [4])/3; the calibration parameter of the third sector is sector_α_scale [3]=(β_scale [4]+β_scale [5]+β_scale [6])/3; and the calibration parameter of the fourth sector is sector_α_scale [4]=(β_scale [6]+β_scale [7]+β_scale [8])/3.

For example, as shown in FIG. 13, eight sectors are obtained through division. In the horizontal direction, the calibration parameter of the first sector is sector_α_scale [1]=(α_scale [1]+α_scale [2])/2; the calibration parameter of the second sector is sector_α_scale [2]=(α_scale [2]+α_scale [3])/2; the calibration parameter of the third sector is sector_α_scale [3]=(α_scale [3]+α_scale [4])/2; the calibration parameter of the fourth sector is sector_α_scale [4]=(α_scale [4]+α_scale [5])/2; the calibration parameter of the fifth sector is sector_α_scale [5]=(α_scale [5]+α_scale [6])/2; the calibration parameter of the sixth sector is sector_α_scale [6]=(α_scale [6]+α_scale [7])/2; the calibration parameter of the seventh sector is sector_α_scale [7]=(α_scale [7]+α_scale [8])/2; and the calibration parameter of the eighth sector is sector_α_scale [8]=(α_scale [8]+α_scale [1])/2. In the vertical direction, the calibration parameter of the first sector is sector_α_scale [1]=(β_scale [1]+β_scale [2])/2; the calibration parameter of the second sector is sector_α_scale [2]=(β_scale [2]+β_scale [3])/2; the calibration parameter of the third sector is sector_β_scale [3]=(β_scale [3]+β_scale [4])/2; the calibration parameter of the fourth sector is sector_β_scale [4]=(β_scale [4]+β_scale [5])/2; the calibration parameter of the fifth sector is sector_β_scale [5]=(β_scale [5]+β_scale [6])/2; the calibration parameter of the sixth sector is sector_β_scale [6]=(β_scale [6]+β_scale [7])/2; the calibration parameter of the seventh sector is sector_β_scale [7]=(β_scale [7]+β_scale [8])/2; and the calibration parameter of the eighth sector is sector_β_scale [8]=(β_scale [8]+β_scale [1])/2.

For example, as shown in FIG. 14, eight sectors are obtained through division and each sector corresponds to a singular point. That is, the sectors respectively correspond to the singular points 1 to 8. Therefore, when sector division is performed in this manner, calibration parameters of the sectors are calibration parameters of all singular points. For details, reference may be made to the foregoing embodiments.

Step S17. Calibrate the joystick according to the calibration parameters of the sectors.

In the foregoing embodiments, an activity range of the joystick is divided into different sectors and then the calibration parameters are calculated based on the sectors. Due to finer sector allocation, calibration data finally obtained is more accurate and stable.

The calibration parameters obtained in the foregoing embodiments can all be stored in the remote control device and the calibration parameters can be directly used each time the remote control device is powered on. When the remote control device is in use, the obtained three-axis magnetic flux data of the sensor Hall chip is calculated through the calibration parameters, integrated into a control instruction and then sent to a controlled apparatus, such as an unmanned aerial vehicle, so as to implement safe control of the controlled apparatus.

According to this embodiment of the present invention, a method for calibrating a joystick is provided. According to the method, when the joystick is in the calibration mode, the sampling parameters of the target point and the maximum angle value to which the joystick is moved are obtained. Then the calibration parameter of the target point is calculated according to the sampling parameters and the maximum angle value, so that the joystick is calibrated according to the calibration parameter. According to the implementation, a calibration function of the Hall joystick is realized. A whole process is simple, complexity of calibrating the Hall joystick is reduced and the implementation is suitable for most of remote control devices with Hall joysticks, which has relatively strong universality.

Figure 15:
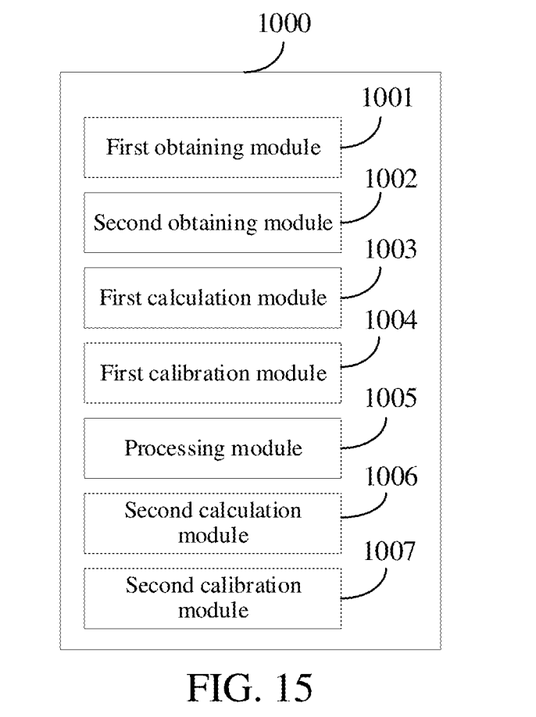
FIG. 15 is a schematic structural diagram of an apparatus for calibrating a joystick according to an embodiment of the present invention.

As shown in FIG. 15, an embodiment of the present invention provides an apparatus 1000 for calibrating a joystick, which is applicable to the foregoing remote control device. The apparatus 1000 for calibrating a joystick includes: a first obtaining module 1001, a second obtaining module 1002, a first calculation module 1003 and a first calibration module 1004.

The first obtaining module 1001 is configured to obtain sampling parameters of a target point when a joystick is in a calibration mode. The second obtaining module 1002 is configured to obtain a maximum angle value to which the joystick is moved. The first calculation module 1003 is configured to calculate a calibration parameter of the target point according to the sampling parameters and the maximum angle value. The first calibration module 1004 is configured to calibrate the joystick according to the calibration parameter.

The first obtaining module 1001 is further configured to: control the joystick to move to the target point when the joystick is in the calibration mode; and calculate a horizontal angle value α and a vertical angle value β corresponding to the target point, the horizontal angle value α and the vertical angle value β being the sampling parameters of the target point, where the $\alpha = \arctan 2\ (\sqrt{(k_a * m_z)^2 + (k_t * m_y)^2},\ m_x)$ and the $\beta = \arctan 2\ (\sqrt{(k_b * m_z)^2 + (k_t * m_x)^2},\ m_y)$, $m_x$, $m_y$ and $m_z$ being magnetic fluxes outputted by a chip in three axes x, y and z and $k_a$, $k_b$ and $k_t$ being preset adjustable parameters.

The first obtaining module 1001 is further configured to: respectively sample the horizontal angle value α and the vertical angle value β of the target point for a preset number of times; and calculate an average value of horizontal angle values α of the preset number of times and an average value of vertical angle values β of the preset number of times, the average value of the horizontal angle values α and the average value of the vertical angle values β being the sampling parameters of the target point.

The target point includes a median point, a diagonal point and a sideline point.

When the target point is the diagonal point, the first calculation module 1003 is further configured to:
perform a subtraction operation between a horizontal angle value of the diagonal point and a horizontal angle value of the median point, to obtain a first difference;
perform a subtraction operation between a vertical angle value of the diagonal point and a vertical angle value of the median point, to obtain a second difference; and
perform a division operation on the maximum angle value and each of the first difference and the second difference, to obtain a first quotient and a second quotient, the first quotient being a calibration parameter of the diagonal point in a horizontal direction and the second quotient being a calibration parameter of the diagonal point in a vertical direction.

The sideline point includes a horizontal axis sideline point and a vertical axis sideline point and when the target point is a horizontal axis sideline point, the first calculation module 1003 is further configured to:
perform a subtraction operation between a horizontal angle value of the horizontal axis sideline point and a horizontal angle value of the median point, to obtain a third difference;
perform a division operation between the maximum angle value and the third difference, to generate a calibration parameter of the horizontal axis sideline point in a horizontal direction; and
when the target point is a vertical axis sideline point, the first calculation module is further configured to:
perform a subtraction operation between a vertical angle value of the vertical axis sideline point and a vertical angle value of the median point, to obtain a fourth difference; and
perform a division operation between the maximum angle value and the fourth difference, to generate a calibration parameter of the vertical axis sideline point in a vertical direction.

A calibration parameter of the median point in the horizontal direction and a calibration parameter in the vertical direction are 1; a calibration parameter of the horizontal axis sideline point in the vertical direction is 1; and a calibration parameter of the vertical axis sideline point in the horizontal direction is 1.

In some embodiments, also referring to FIG. 15, the apparatus 1000 further includes a processing module 1005, a second calculation module 1006 and a second calibration module 1007. The processing module 1005 is configured to perform division around the target point to obtain sectors according to a position of the target point. The second calculation module 1006 is configured to calculate calibration parameters of the sectors according to the sectors obtained through the division and the calibration parameter of the target point. The second calibration module 1007 is configured to calibrate the joystick according to the calibration parameters of the sectors.

The second calculation module 1006 is further configured to: determine target points corresponding to the sectors; and average calibration parameters of the target points corresponding to the sectors, to generate the calibration parameters of the sectors.

It should be noted that content such as information exchange and an execution process between the modules in the apparatus is based on a same idea as the method embodiments of the present invention. Therefore, for detailed content, refer to descriptions in the method embodiments of the present invention and details are not described herein again.

According to this embodiment of the present invention, an apparatus for calibrating a joystick is provided. According to the apparatus, when the joystick is in the calibration mode, the sampling parameters of the target point and the maximum angle value to which the joystick is moved are obtained. Then the calibration parameter of the target point is calculated according to the sampling parameters and the maximum angle value, so that the joystick is calibrated according to the calibration parameter. According to the implementation, a calibration function of the Hall joystick is realized. A whole process is simple, complexity of calibrating the Hall joystick is reduced and the implementation is suitable for most of remote control devices with Hall joysticks, which has relatively strong universality.

Figure 16:
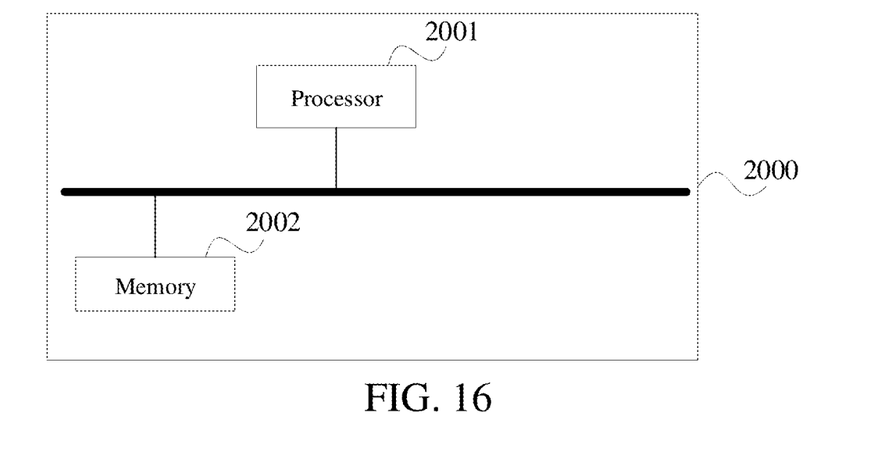
FIG. 16 is a schematic structural diagram of a remote control device according to an embodiment of the present invention.

As shown in FIG. 16, an embodiment of the present invention provides a remote control device 2000. The remote control device 2000 includes:
a remote control body (not shown in the figure) and a Hall joystick (not shown in the figure). The Hall joystick is fixed on the remote control body and the number of Hall joysticks is not specifically limited.

One or more processors 2001 and a memory 2002 are disposed in the remote control device 2000. One processor 2001 is used as an example in FIG. 16. The Hall joystick and the memory 2002 are separately communicatively connected to the processor 2001.

The processor 2001 and the memory 2002 may be connected through a bus or in other manners and are, for example, connected through a bus in FIG. 16.

The memory 2002, as a non-volatile computer-readable storage medium, may be configured to store a non-volatile software program, a non-volatile computer-executable program and a module, for example, program instructions/modules corresponding to the method for calibrating a joystick in the embodiments of the present invention (for example, the modules shown in FIG. 15). The processor 2001 performs various functional applications and data processing of the server by running the non-volatile software program, instructions and module stored in the memory 2002, that is, implementing the method for calibrating a joystick provided in the foregoing method embodiments.

The memory 2002 may include a program storage area and a data storage area. The program storage area may store an operating system and an application program that is required for at least one function. The storage data region may store data and the like created according to use of the apparatus for calibrating a joystick. In addition, the memory 2002 may include a high-speed random access memory and may also include a nonvolatile memory, for example, at least one magnetic disk storage device, a flash memory, or another non-volatile solid-state storage device. In some embodiments, the memory 2002 optionally includes memories remotely disposed relative to the processor 2001 and the remote memories may be connected to the apparatus for calibrating a joystick through a network. The foregoing examples of the network include, but are not limited to, the Internet, an intranet, a local area network, a mobile communication network and a combination thereof.

The one or more modules are stored in the memory 2002 and when executed by the one or more processors 2001, perform the method for calibrating a joystick in any of the foregoing method embodiments, for example, perform the foregoing methods implemented in FIG. 4 and FIG. 6 to FIG. 11, to implement the functions of the modules in FIG. 15.

For the foregoing product, the method provided in the embodiments of the present application may be performed and the corresponding functional modules for performing the method and beneficial effects thereof are provided. For technical details not described in detail in this embodiment, reference may be made to the method provided in the embodiments of the present invention.

The remote control device 2000 according to this embodiment of the present invention exists in various forms, including but not limited to a remote control and other electronic devices having a data exchange function. The remote control device 2000 can be configured to control an unmanned aerial vehicle, an unmanned ground vehicle or the like.

An embodiment of the present invention provides a non-volatile computer-readable storage medium, storing computer-executable instructions, the computer-executable instructions being executed by an electronic device to perform the method for calibrating a joystick in any of the foregoing method embodiments, for example, perform the foregoing methods implemented in FIG. 4 and FIG. 6 to FIG. 11, to implement the functions of the modules in FIG. 15.

An embodiment of the present invention further provides a computer program product, including a computer program stored in a non-volatile computer-readable storage medium, the computer program including program instructions, the program instructions, when executed by a computer, causing the computer to perform the method for calibrating a joystick in any of the foregoing method embodiments, for example, perform the foregoing methods implemented in FIG. 4 and FIG. 6 to FIG. 11, to implement the functions of the modules in FIG. 15.

The foregoing described device embodiments are merely examples. The units described as separate parts may or may not be physically separate and the parts displayed as units may or may not be physical units, may be located in one position, or may be distributed on a plurality of network units. A part or all of the modules may be selected according to actual requirements to achieve the objectives of the solutions of the embodiments of the present invention.

Based on the descriptions of the foregoing implementations, a person of ordinary skill in the art may clearly understand that the implementations may be implemented by software in addition to a universal hardware platform, or by hardware. A person of ordinary skill in the art may understand that, all or some of the processes of the method in the foregoing embodiments may be implemented by a computer program instructing relevant hardware. The program may be stored in a computer-readable storage medium. During execution of the program, the processes of the foregoing method embodiments may be included. The foregoing storage medium may include a magnetic disc, an optical disc, a read-only memory (ROM), a random access memory (RAM), or the like.

Finally, it should be noted that the foregoing embodiments are merely used for describing the technical solutions of the disclosure, but are not intended to limit the disclosure. Under the ideas of the present invention, the technical features in the foregoing embodiments or different embodiments may also be combined, the steps may be performed in any order and many other changes of different aspects of the present invention also exists as described above and these changes are not provided in detail for simplicity. It should be understood by a person of ordinary skill in the art that although the present disclosure has been described in detail with reference to the foregoing embodiments, modifications can be made to the technical solutions described in the foregoing embodiments, or equivalent replacements can be made to some technical features in the technical solutions and these modifications or replacements will not cause the essence of corresponding technical solutions to depart from the scope of the technical solutions in the embodiments of the disclosure.

What is claimed is:

1. A method for calibrating a joystick, applicable to a remote control device, while the joystick is in a calibration mode, the method comprising:
   obtaining an original parameter related to an original position of the joystick;
   moving the joystick to a target point;
   obtaining, by a processor, sampling parameters related to a sampled position of the joystick while the joystick is at the target point;
   moving the joystick to a maximum angle;
   obtaining, by the processor, a maximum angle value related to a position of the joystick while the joystick is at the maximum angle;
   calculating, by the processor, a calibration parameter of the target point using the sampling parameters and the maximum angle value; and
   calibrating the joystick according to the calibration parameter, wherein said calibrating the joystick includes
      obtaining a new parameter of the joystick using the calibration parameter and the original parameter; and
      converting the new parameter of the joystick into a joystick instruction configured for controlling a remotely controlled device.

2. The method according to claim 1, wherein the obtaining sampling parameters of a target point comprises:
   calculating, by the processor, a horizontal angle value $\alpha$ and a vertical angle value $\beta$ corresponding to the target point, the horizontal angle value $\alpha$ and the vertical angle value $\beta$ being the sampling parameters of the target point,
   wherein the $\alpha = \arctan 2\ (\sqrt{(k_a * m_z)^2 + (k_t * m_y)^2},\ m_x)$ and the $\beta = \arctan 2\ (\sqrt{(k_b * m_z)^2 + (k_t * m_x)^2},\ m_y)$,
   $m_x$, $m_y$, and $m_z$ being magnetic fluxes outputted by a chip in three axes x, y and z and $k_a$, $k_b$ and $k_t$ being preset adjustable parameters.

3. The method according to claim 2, further comprising:
   respectively sampling, by the processor, the horizontal angle value $\alpha$ and the vertical angle value $\beta$ of the target point for a preset number of times; and
   calculating, by the processor, an average value of horizontal angle values $\alpha$ of the preset number of times and an average value of vertical angle values $\beta$ of the preset number of times, the average value of the horizontal angle values $\alpha$ and the average value of the vertical angle values $\beta$ being the sampling parameters of the target point.

4. The method according to claim 3, wherein the target point comprises a median point, a diagonal point and a sideline point.

5. The method according to claim 4, wherein when the target point is the diagonal point,
   the calculating a calibration parameter of the target point according to the sampling parameters and the maximum angle value comprises:

performing, by the processor, a subtraction operation between a horizontal angle value of the diagonal point and a horizontal angle value of the median point, to obtain a first difference;

performing, by the processor, a subtraction operation between a vertical angle value of the diagonal point and a vertical angle value of the median point, to obtain a second difference; and performing, by the processor, a division operation on the maximum angle value and each of the first difference and the second difference, to obtain a first quotient and a second quotient, the first quotient being a calibration parameter of the diagonal point in a horizontal direction and the second quotient being a calibration parameter of the diagonal point in a vertical direction.

6. The method according to claim 4, wherein the sideline point comprises a horizontal axis sideline point and a vertical axis sideline point, when the target point is the horizontal axis sideline point, the calculating a calibration parameter of the target point according to the sampling parameters and the maximum angle value comprises:

performing, by the processor, a subtraction operation between a horizontal angle value of the horizontal axis sideline point and a horizontal angle value of the median point, to obtain a third difference;

performing, by the processor, a division operation between the maximum angle value and the third difference, to generate a calibration parameter of the horizontal axis sideline point in a horizontal direction; and when the target point is the vertical axis sideline point, the calculating a calibration parameter of the target point according to the sampling parameters and the maximum angle value comprises:

performing, by the processor, a subtraction operation between a vertical angle value of the vertical axis sideline point and a vertical angle value of the median point, to obtain a fourth difference; and performing, by the processor, a division operation between the maximum angle value and the fourth difference, to generate a calibration parameter of the vertical axis sideline point in a vertical direction.

7. The method according to claim 6, wherein a calibration parameter of the median point in the horizontal direction and a calibration parameter in the vertical direction are 1;

a calibration parameter of the horizontal axis sideline point in the vertical direction is 1; and a calibration parameter of the vertical axis sideline point in the horizontal direction is 1.

8. The method according to claim 1, further comprising:

performing, by the processor, division around the target point to obtain sectors according to a position of the target point;

calculating, by the processor, calibration parameters of the sectors according to the sectors obtained through the division and the calibration parameter of the target point; and calibrating the joystick according to the calibration parameters of the sectors.

9. The method according to claim 8, wherein the calculating calibration parameters of the sectors according to the sectors obtained through the division and the calibration parameter of the target point comprises:

determining, by the processor, target points corresponding to the sectors; and averaging, by the processor, calibration parameters of the target points corresponding to the sectors, to generate the calibration parameters of the sectors.

10. An apparatus for calibrating a joystick while the joystick in in a calibration mode, applicable to a remote control device and comprising:

at least one processor; and a memory communicatively connected to the at least one processor, wherein the memory stores instructions executable by the at least one processor and the instructions are executed by the at least one processor, wherein the at least one processor:

obtains an original parameter of a joystick related to the original position of the joystick;

after the joystick has been moved to a target point, obtains sampling parameters related to a sampled position of the joystick while the joystick is at the target point when the joystick is in a calibration mode;

after the joystick has been moved to a maximum angle, obtains a maximum angle value related to a position of the joystick while the joystick is at the maximum angle;

calculates a calibration parameter of the target point using the sampling parameters and the maximum angle value; and calibrates the joystick according to the calibration parameter, wherein said at least one processor obtains a new parameter of the joystick using the calibration parameter and the original parameter, and converts the new parameter of the joystick into a joystick instruction configured for controlling a remotely controlled device.

11. The apparatus according to claim 10, wherein the at least one processor controls the joystick to move to the target point; and calculates a horizontal angle value $\alpha$ and a vertical angle value $\beta$ corresponding to the target point, the horizontal angle value $\alpha$ and the vertical angle value $\beta$ being the sampling parameters of the target point, wherein the $\alpha = \arctan 2\ (\sqrt{(k_a * m_z)^2 + (k_t * m_y)^2},\ m_x)$ and the $\beta = \arctan 2\ (\sqrt{(k_b * m_z)^2 + (k_t * m_x)^2},\ m_y)$, $m_x$, $m_y$, and $m_z$ being magnetic fluxes outputted by a chip in three axes x, y and z and $k_a$, $k_b$ and $k_t$ being preset adjustable parameters.

12. The apparatus according to claim 11, wherein the at least one processor:

respectively samples the horizontal angle value $\alpha$ and the vertical angle value $\beta$ of the target point for a preset number of times; and calculates an average value of horizontal angle values $\alpha$ of the preset number of times and an average value of vertical angle values $\beta$ of the preset number of times, the average value of the horizontal angle values $\alpha$ and the average value of the vertical angle values $\beta$ being the sampling parameters of the target point.

13. The apparatus according to claim 12, wherein the target point comprises a median point, a diagonal point and a sideline point.

14. The apparatus according to claim 13, wherein when the target point is the diagonal point, and the at least one processor:

calculates a calibration parameter of the target point according to the sampling parameters and the maximum angle value, comprising:
performing a subtraction operation between a horizontal angle value of the diagonal point and a horizontal angle value of the median point, to obtain a first difference;
performing a subtraction operation between a vertical angle value of the diagonal point and a vertical angle value of the median point, to obtain a second difference; and
performing a division operation on the maximum angle value and each of the first difference and the second difference, to obtain a first quotient and a second quotient, the first quotient being a calibration parameter of the diagonal point in a horizontal direction and the second quotient being a calibration parameter of the diagonal point in a vertical direction.

15. The apparatus according to claim 14, wherein the sideline point comprises a horizontal axis sideline point and a vertical axis sideline point, and wherein the at least one processor:
performs a subtraction operation between a horizontal angle value of the horizontal axis sideline point and a horizontal angle value of the median point, to obtain a third difference;
performs a division operation between the maximum angle value and the third difference, to generate a calibration parameter of the horizontal axis sideline point in a horizontal direction;
performs a subtraction operation between a vertical angle value of the vertical axis sideline point and a vertical angle value of the median point, to obtain a fourth difference; and
performs a division operation between the maximum angle value and the fourth difference, to generate a calibration parameter of the vertical axis sideline point in a vertical direction.

16. The apparatus according to claim 15, wherein
a calibration parameter of the median point in the horizontal direction and a calibration parameter in the vertical direction are 1;
a calibration parameter of the horizontal axis sideline point in the vertical direction is 1; and
a calibration parameter of the vertical axis sideline point in the horizontal direction is 1.

17. The apparatus according to claim 11, wherein the at least one processor:
performs division around the target point to obtain sectors according to a position of the target point;
calculates calibration parameters of the sectors according to the sectors obtained through the division and the calibration parameter of the target point; and
calibrates the joystick according to the calibration parameters of the sectors.

18. The apparatus according to claim 17, wherein the at least one processor:
determines target points corresponding to the sectors; and
averages calibration parameters of the target points corresponding to the sectors, to generate the calibration parameters of the sectors.

19. A remote control device, comprising:
a remote control body;
a Hall joystick, fixed on the remote control body;
at least one processor; and
a memory communicatively connected to the at least one processor,
wherein the memory stores instructions executable by the at least one processor and the instructions are executed by the at least one processor, and wherein the at least one processor:
obtains an original parameter related to an original position of the joystick;
after the joystick has been moved to a target point, obtains sampling parameters related to a sampled position of the joystick while the joystick is at the target point when a joystick is in a calibration mode;
obtains a maximum angle value related to a position of the joystick while the joystick is at the maximum angle;
calculates a calibration parameter of the target point using the sampling parameters and the maximum angle value; and
calibrates the joystick according to the calibration parameter, wherein said at least one processor
obtains a new parameter of the joystick using the calibration parameter and the original parameter, and
converts the new parameter of the joystick into a joystick instruction configured for controlling a remotely controlled device.

20. The remote control according to claim 19, wherein the at least one processor:
controls the joystick to move to the target point; and
calculates a horizontal angle value $\alpha$ and a vertical angle value $\beta$ corresponding to the target point, the horizontal angle value $\alpha$ and the vertical angle value $\beta$ being the sampling parameters of the target point,
wherein the $\alpha=\arctan 2\ (\sqrt{(k_a{}^*m_z)^2+(k_t{}^*m_y)^2},\ m_x)$ and the $\beta=\arctan 2\ (\sqrt{(k_b{}^*m_z)^2+(k_t{}^*m_x)^2},\ m_y)$,
$m_x$, $m_y$, and $m_z$ being magnetic fluxes outputted by a chip in three axes x, y and z and $k_a$, $k_b$ and $k_t$ being preset adjustable parameters.

21. The remote control according to claim 20, wherein the at least one processor:
respectively samples the horizontal angle value $\alpha$ and the vertical angle value $\beta$ of the target point for a preset number of times; and
calculates an average value of horizontal angle values $\alpha$ of the preset number of times and an average value of vertical angle values $\beta$ of the preset number of times, the average value of the horizontal angle values $\alpha$ and the average value of the vertical angle values $\beta$ being the sampling parameters of the target point.

22. The remote control according to claim 21, wherein the target point comprises a median point, a diagonal point and a sideline point.

23. The remote control according to claim 22, wherein when the target point is the diagonal point, and the at least one processor:
calculates a calibration parameter of the target point according to the sampling parameters and the maximum angle value comprises:
performs a subtraction operation between a horizontal angle value of the diagonal point and a horizontal angle value of the median point, to obtain a first difference;
performs a subtraction operation between a vertical angle value of the diagonal point and a vertical angle value of the median point, to obtain a second difference; and
performs a division operation on the maximum angle value and each of the first difference and the second difference, to obtain a first quotient and a second quotient, the first quotient being a calibration parameter of the diagonal point in a horizontal direction and the second quotient being a calibration parameter of the diagonal point in a vertical direction.

24. The remote control according to claim 23, wherein the sideline point comprises a horizontal axis sideline point and a vertical axis sideline point, and the at least one processor:
performs a subtraction operation between a horizontal angle value of the horizontal axis sideline point and a horizontal angle value of the median point, to obtain a third difference;
performs a division operation between the maximum angle value and the third difference, to generate a calibration parameter of the horizontal axis sideline point in a horizontal direction;
performs a subtraction operation between a vertical angle value of the vertical axis sideline point and a vertical angle value of the median point, to obtain a fourth difference; and
performs a division operation between the maximum angle value and the fourth difference, to generate a calibration parameter of the vertical axis sideline point in a vertical direction.

25. The remote control according to claim 24, wherein
a calibration parameter of the median point in the horizontal direction and a calibration parameter in the vertical direction are 1;
a calibration parameter of the horizontal axis sideline point in the vertical direction is 1; and
a calibration parameter of the vertical axis sideline point in the horizontal direction is 1.

26. The remote control according to claim 20, wherein the at least one processor:
performs division around the target point to obtain sectors according to a position of the target point;
calculates calibration parameters of the sectors according to the sectors obtained through the division and the calibration parameter of the target point; and
calibrates the joystick according to the calibration parameters of the sectors.

27. The remote control according to claim 26, wherein the at least one processor:
determines target points corresponding to the sectors; and
averages calibration parameters of the target points corresponding to the sectors, to generate the calibration parameters of the sectors.

* * * * *